(12) United States Patent
Yamahara (10) Patent No.: US 9,564,147 B2
(45) Date of Patent: Feb. 7, 2017

(54) AUDIO COMMUNICATION SYSTEM, AUDIO COMMUNICATION METHOD, AUDIO COMMUNICATION PURPOSE PROGRAM, AUDIO TRANSMISSION TERMINAL, AND AUDIO TRANSMISSION TERMINAL PURPOSE PROGRAM

(71) Applicant: Rakuten, Inc., Setagaya-ku, Tokyo (JP)

(72) Inventor: Hisanori Yamahara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/787,947

(22) PCT Filed: Apr. 30, 2013

(86) PCT No.: PCT/JP2013/062647
§ 371 (c)(1),
(2) Date: Oct. 29, 2015

(87) PCT Pub. No.: WO2014/178122
PCT Pub. Date: Nov. 6, 2014

(65) Prior Publication Data
US 2016/0093314 A1   Mar. 31, 2016

(51) Int. Cl.
*G10L 21/00* (2013.01)
*G10L 21/0356* (2013.01)
(Continued)

(52) U.S. Cl.
CPC ......... *G10L 21/0356* (2013.01); *G10L 21/034* (2013.01); *G10L 25/60* (2013.01); *H04M 19/04* (2013.01)

(58) Field of Classification Search
USPC   704/225, 206, 210, 234, 267, 219; 455/406, 550.1; 379/406.08; 702/19; 84/609; 375/346
See application file for complete search history.

(56) References Cited

U.S. PATENT DOCUMENTS 5,175,875 A * 12/1992 Yokoya ............... H04B 7/26
455/116
5,335,312 A * 8/1994 Mekata ............... G10L 21/0208
704/202

(Continued)

FOREIGN PATENT DOCUMENTS

JP   8-32508 A   2/1996
JP   9-98122 A   4/1997

(Continued)

OTHER PUBLICATIONS

International Preliminary Report on Patentability dated Nov. 12, 2015 from the International Bureau in counterpart International Application No. PCT/JP2013/062647.

(Continued)

*Primary Examiner* — Pierre-Louis Desir
*Assistant Examiner* — Neeraj Sharma
(74) *Attorney, Agent, or Firm* — Sughrue Mion, PLLC (57) ABSTRACT

An audio communication system includes a generation unit that superimposes an addition sound having a volume level determined on the basis of a voice acquired by a voice acquisition unit on an input voice acquired by the voice acquisition unit of a transmission terminal and generates a synthesis sound and a transmission unit that transmits a signal of the synthesis sound generated by the generation unit to a reception terminal.

8 Claims, 6 Drawing Sheets

(51) Int. Cl.
  *H04M 19/04* (2006.01)
  *G10L 21/034* (2013.01)
  *G10L 25/60* (2013.01)
  *G10L 15/00* (2013.01)
  *G10L 13/00* (2006.01)
  *H04M 11/00* (2006.01)
  *H04M 1/00* (2006.01)
  *H04M 9/08* (2006.01)
  *H04L 1/00* (2006.01)
  *G01N 33/48* (2006.01)
  *G04B 13/00* (2006.01)

(56) References Cited

U.S. PATENT DOCUMENTS

| | | | | |
|---|---|---|---|---|
| 6,415,253 | B1* | 7/2002 | Johnson | G10L 21/0208 381/94.2 |
| 7,089,181 | B2* | 8/2006 | Erell | G10L 21/02 704/225 |
| 7,555,117 | B2* | 6/2009 | Suppappola | H04B 3/23 370/286 |
| 8,639,214 | B1* | 1/2014 | Fujisaki | G06Q 20/32 379/88.03 |
| 2003/0154073 | A1* | 8/2003 | Ota | G10L 19/018 704/207 |
| 2004/0085943 | A1* | 5/2004 | Hsu | H04L 1/1848 370/338 |
| 2005/0010404 | A1* | 1/2005 | Son | G10L 19/24 704/219 |
| 2007/0094031 | A1* | 4/2007 | Chen | G10L 21/04 704/267 |
| 2010/0046680 | A1* | 2/2010 | Okino | H04B 7/0857 375/346 |
| 2010/0131270 | A1* | 5/2010 | Charzinski | G10L 21/0208 704/234 |
| 2014/0207443 | A1* | 7/2014 | Hosoya | G10L 19/012 704/206 |
| 2014/0336948 | A1* | 11/2014 | Qin | A61B 5/7217 702/19 |

FOREIGN PATENT DOCUMENTS

| | | |
|---|---|---|
| JP | 2001-175300 A | 6/2001 |
| JP | 2004-343443 A | 12/2004 |
| JP | 2004-343566 A | 12/2004 |
| JP | 2009-118200 A | 5/2009 |

OTHER PUBLICATIONS

International Search Report dated Jul. 30, 2013 in counterpart International Application No. PCT/JP2013/062647.

* cited by examiner

AUDIO COMMUNICATION SYSTEM, AUDIO COMMUNICATION METHOD, AUDIO COMMUNICATION PURPOSE PROGRAM, AUDIO TRANSMISSION TERMINAL, AND AUDIO TRANSMISSION TERMINAL PURPOSE PROGRAM

CROSS REFERENCE TO RELATED APPLICATIONS

This application is a National Stage of International Application No. PCT/JP2013/062647, filed on Apr. 30, 2013, the contents of all of which are incorporated herein by reference in their entirety.

TECHNICAL FIELD

An aspect of the present invention relates to an audio communication system, an audio communication method, an audio communication purpose program, an audio transmission terminal, and an audio transmission terminal purpose program.

BACKGROUND ART

Conventionally, an audio communication system for transmitting a voice signal from a transmission terminal to a reception terminal via a communication line is provided. However, the partial or entire voice signal may become defective in a communication path between the transmission terminal and the reception terminal and a voice from the transmission terminal may be interrupted in the reception terminal, according to a communication situation.

As an example of a system for notifying a user of an error of communication between the transmission terminal and the reception terminal, a system described in Patent Literature 1 is known. A mobile communication system including a mobile communication terminal measuring an ambient field strength and a remaining battery capacity and transmitting the measured field strength and remaining battery capacity to a base station and the base station determining whether communication is disconnected due to a decrease in the field strength or a decrease in the remaining battery capacity of the mobile communication terminal by referring to a measurement result and notifying the mobile communication terminal of a determination result, when the communication is disconnected abruptly, is described in Patent Literature 1. In the mobile communication system, when the communication disconnection occurs, a message showing whether a cause of the error thereof is the field strength, the remaining battery capacity, or other abnormality is transmitted to the terminal, so that the cause of the communication disconnection can be recognized by a user of the mobile communication terminal.

CITATION LIST

Patent Literature

Patent Literature 1: JP-2009-118200-A

SUMMARY OF INVENTION

Technical Problem

However, in the mobile communication system described in Patent Literature 1, a function of measuring the ambient field strength and the remaining battery capacity and transmitting the measurement result to the base station needs to be added to the mobile communication terminal to notify the user of the mobile communication terminal of the cause of the communication disconnection and the mobile communication terminal needs to be modified. In addition, in the mobile communication system described in Patent Literature 1, when the voice from the transmission terminal is interrupted in the reception terminal, it may be difficult to determine whether the cause of the interruption is non-utterance of a voice from the user of the transmission terminal or a defect of the voice signal.

Accordingly, it is requested to provide an audio communication system, an audio communication method, an audio communication purpose program, an audio transmission terminal, and an audio transmission terminal purpose program that enable a defect of a voice signal to be recognized in a reception terminal, without modifying the reception terminal to provide a cause of communication disconnection.

Solution to Problem

An audio communication system according to one aspect of the present invention includes a generation unit that superimposes an addition sound having a volume level determined on the basis of a voice acquired by a voice acquisition unit on an input voice acquired by the voice acquisition unit of a transmission terminal, and generates a synthesis sound, and a transmission unit that transmits a signal of the synthesis sound generated by the generation unit to a reception terminal.

In the audio communication system, the addition sound having the volume level determined on the basis of the voice acquired by the voice acquisition unit is superimposed on the input voice and the synthesis sound is generated. In addition, the signal of the synthesis sound is transmitted to the reception terminal. As a result, a user of the reception terminal can determine that a defect has occurred in the signal of the input voice, when the addition sound of the synthesis sound is interrupted. Because the addition sound is superimposed on the input voice and is transmitted to the reception terminal, a new function is not necessary in the reception terminal to detect the defect of the input signal. Therefore, according to the audio communication system, the defect of the voice signal to be the signal of the input voice can be detected in the reception terminal without modifying the reception terminal. In addition, because the volume level of the addition sound is determined on the basis of the volume acquired by the voice acquisition unit, the volume level of the addition sound can be set not to interfere with a conversation of the user.

In the audio communication system according to another aspect of the present invention, the generation unit may adjust the volume level of the addition sound, such that the volume level of the addition sound becomes smaller than a volume level of the input voice acquired by the voice acquisition unit, and generate the synthesis sound.

The audio communication system according to another aspect of the present invention may further include a communication quality detection unit that detects a communication quality between the transmission terminal and the reception terminal, in which the generation unit may generate the synthesis sound in which the volume level of the addition sound has been changed, when the communication quality detected by the communication quality detection unit is less than a reference value.

The audio communication system according to another aspect of the present invention may further include a defect detection unit that detects a defective portion of the input voice on the basis of the addition sound of the signal received in the reception terminal, a retransmission request acquisition unit that acquires a retransmission request of the defective portion from the reception terminal according to a request of a user of the reception terminal, a retransmission unit that retransmits a signal of the input voice corresponding to the defective portion to the reception terminal according to the retransmission request, and a control unit that controls the transmission unit, such that the signal of the synthesis sound is not transmitted from the transmission unit, in a retransmission time zone to be a time zone in which the signal of the input voice corresponding to the defective portion is transmitted from the retransmission unit.

In the audio communication system according to another aspect of the present invention, the control unit may detect an input voice acquired by the voice acquisition unit in the retransmission time zone and set transmission timing of a signal of a synthesis sound including the detected input voice to a timing when the retransmission time zone ends.

In the audio communication system according to another aspect of the present invention, the retransmission unit may set a predetermined section including the defective portion in the input voice on the basis of the defective portion, and retransmit the input voice in the predetermined section to the reception terminal.

In the audio communication system according to another aspect of the present invention, the retransmission unit may set the predetermined section on the basis of a volume or a tone of the input voice.

In the audio communication system according to another aspect of the present invention, the retransmission unit may determine whether the signal of the input voice corresponding to the defective portion is retransmitted to the reception terminal according to the reception terminal.

In the audio communication system according to another aspect of the present invention, the retransmission unit may retransmit a signal of a voice in which the input voice corresponding to the defective portion is fast-forwarded to the reception terminal.

In the audio communication system according to another aspect of the present invention, the retransmission unit may retransmit a signal of a voice from which a silence portion of the defective portion is removed to the reception terminal.

An audio communication method according to one aspect of the present invention includes a generation step of superimposing an addition sound having a volume level determined on the basis of a voice acquired by a voice acquisition unit on an input voice acquired by the voice acquisition unit of a transmission terminal, and generating a synthesis sound and a transmission step of transmitting a signal of the synthesis sound generated in the generation step to a reception terminal.

An audio communication purpose program according to one aspect of the present invention causes a computer to function as a generation unit that superimposes an addition sound having a volume level determined on the basis of a voice acquired by a voice acquisition unit on an input voice acquired by the voice acquisition unit of a transmission terminal, and generates a synthesis sound, and a transmission unit that transmits a signal of the synthesis sound generated by the generation unit to a reception terminal.

An audio transmission terminal according to one aspect of the present invention includes a generation unit that superimposes an addition sound having a volume level determined on the basis of a voice acquired by a voice acquisition unit on an input voice acquired by the voice acquisition unit of an audio transmission terminal, and generates a synthesis sound, and a transmission unit that transmits a signal of the synthesis sound generated by the generation unit to a reception terminal.

An audio transmission terminal purpose program according to one aspect of the present invention causes an audio transmission terminal to function as a generation unit that superimposes an addition sound having a volume level determined on the basis of a voice acquired by a voice acquisition unit on an input voice acquired by the voice acquisition unit of the audio transmission terminal, and generates a synthesis sound, and a transmission unit that transmits a signal of the synthesis sound generated by the generation unit to a reception terminal.

According to one aspect of the present invention, the defect of the voice signal to be the signal of the input voice can be detected in the reception terminal without modifying the reception terminal as described above.

Advantageous Effects of Invention

According to one aspect of the present invention, a defect of a voice signal can be recognized in a reception terminal without modifying a reception terminal to provide a cause of communication disconnection.

DESCRIPTION OF EMBODIMENTS

Hereinafter, embodiments of the present invention will be described in detail with reference to the accompanying drawings. In description of the drawings, the same or equivalent elements are denoted with the same reference numerals and overlapped explanation is omitted.

An audio communication system 1 is a computer system to transmit a voice signal from a transmission terminal to a reception terminal via a communication line. For example, the audio communication system 1 can be used for a voice call using the communication line.

Figure 1:
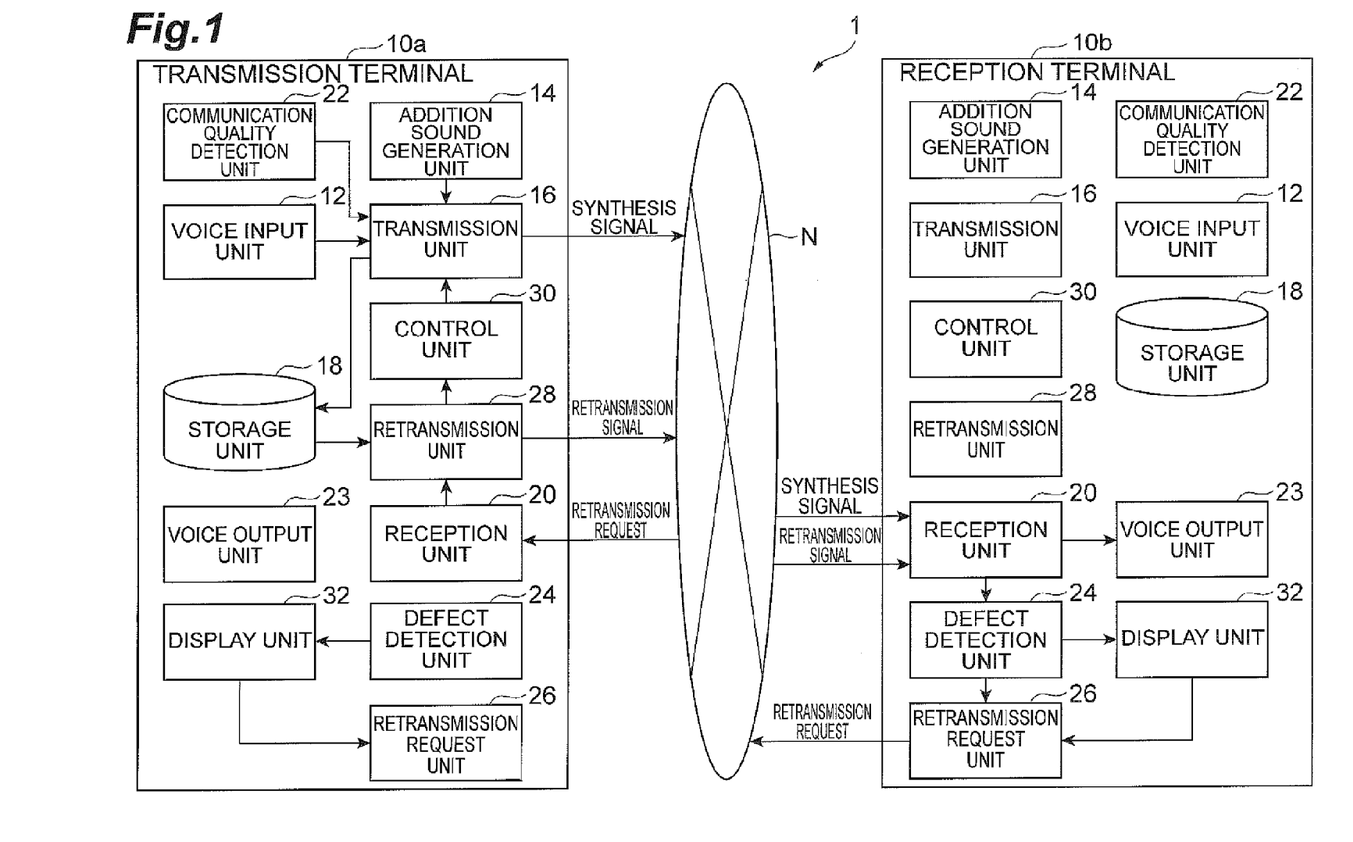
FIG. 1 is a diagram illustrating a functional configuration of an audio communication system according to an embodiment.

FIG. 1 is a diagram illustrating a functional configuration of an audio communication system according to an embodiment. The audio communication system 1 is configured by connecting a transmission terminal (audio transmission terminal) 10a and a reception terminal 10b to each other via a network N. The network N is a wired or wireless general-purpose line or dedicated line, for example.

The transmission terminal 10a is a communication terminal that transmits a voice (hereinafter, also referred to as an input voice) uttered from a user as a voice signal to the reception terminal 10b. As illustrated in FIG. 1, the transmission terminal 10a and the reception terminal 10b include the same functional configuration. Hereinafter, when it is not necessary to distinguish the transmission terminal 10a and the reception terminal 10b from each other, the transmission terminal 10a and the reception terminal 10b are collectively called a terminal 10. The terminal 10 can function as both the reception terminal and the transmission terminal. The terminal 10 is a portable or stationary personal computer or various portable terminals. However, types of communication terminals are not limited. Hereinafter, the transmission terminal 10a is described as a transmission terminal to transmit a voice signal and the reception terminal 10b is described as a reception terminal to receive a voice signal.

Figure 2:
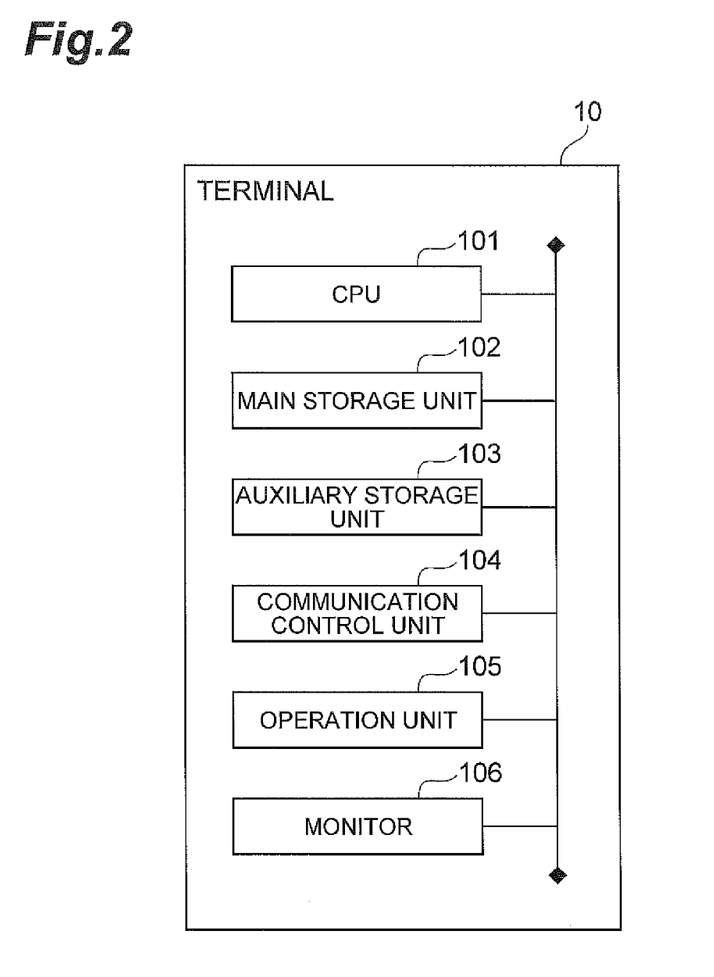
FIG. 2 is a diagram illustrating a hardware configuration of a terminal according to an embodiment.

As illustrated in FIG. 2, the terminal 10 includes a CPU 101 that executes an operating system and an application program, a main storage unit 102 that is configured by a ROM and a RAM, an auxiliary storage unit 103 that is configured by a memory, a communication control unit 104 that performs data communication via the network N, an operation unit 105 that is configured by a key to input a letter/number and command an execution, and a monitor 106 that is configured by a liquid crystal display device. Each function of the terminal 10 is realized by reading predetermined software on the CPU 101 and the main storage unit 102, operating the communication control unit 104 under control of the CPU 101, and performing reading and writing of data in the main storage unit 102 and the auxiliary storage unit 103.

Referring to FIG. 1, a configuration of the audio communication system 1 according to the embodiment will be described while a configuration of the terminal 10 according to the embodiment is described. As described above, because the transmission terminal 10a and the reception terminal 10b include the same functional configuration, each functional configuration of the terminal 10 will be described using any one of the transmission terminal 10a and the reception terminal 10b.

As illustrated in FIG. 1, the terminal 10 includes a voice input unit (voice acquisition unit) 12, an addition sound generation unit 14, a transmission unit 16, a storage unit 18, a reception unit (retransmission request acquisition unit) 20, and a voice output unit 23.

The voice input unit 12 is a functional element that receives the input voice of the user of the transmission terminal 10a. The voice input unit 12 is a microphone, for example, and collects the voice of the user of the transmission terminal 10a and converts the voice into a voice signal. The voice input unit 12 outputs the voice signal to the transmission unit 16.

The addition sound generation unit 14 is a functional element that generates an addition sound to be a sound different from the input voice. The addition sound is any sound distinguished from the input voice and music or a pattern sound is exemplified. In addition, the addition sound may be a sound having a strength (that is, a volume) changing temporally in all frequency bands of a human audible band or a sound having a constant strength. The addition sound generation unit 14 outputs the generated addition sound to the transmission unit 16.

The transmission unit 16 is a functional element that generates a synthesis sound by superimposing the addition sound output from the addition sound generation unit 14 on the input voice output from the voice input unit 12 and transmits a synthesis signal to be a signal of the synthesis sound from the transmission terminal 10a to the reception terminal 10b via the network N. The transmission unit 16 superimposes an addition sound having a volume level determined on the basis of a voice acquired by the voice input unit 12 and generates a synthesis sound. For example, the transmission unit 16 can generate the synthesis sound by adjusting a volume level of the addition sound, such that the volume level of the addition sound becomes smaller than a volume level of the input voice acquired by the voice input unit 12. For example, the volume level of the addition sound may be determined in a step of a factory shipment, such that the volume level becomes smaller than a volume level of a general input voice. In addition, an average value of volume levels of an input voice of a user of the transmission terminal 10a in previous audio communication is calculated and the volume level of the addition sound may be determined such that the volume level becomes smaller than the average value. In addition, a volume level of an input voice input to the voice input unit 12 in real time may be acquired and the volume level of the addition sound may be adjusted in real time, such that the volume level becomes a volume level less than the volume level. The transmission unit 16 configures a generation unit and a transmission unit in claims.

In addition, in the embodiment, the terminal 10 can further include a communication quality detection unit 22. The communication quality detection unit 22 is a functional element that detects a communication quality between the transmission terminal 10a and the reception terminal 10b. For example, the communication quality detection unit 22 can detect the communication quality by monitoring a difference of a transmission time and a reception time of the synthesis signal. In addition, the communication quality detection unit 22 may detect the communication quality, on the basis of a radio wave strength of the transmission terminal 10a and the reception terminal 10b and a packet error rate of data transmission and reception between the transmission terminal 10a and the reception terminal 10b. In the case in which the audio communication system 1 introduces a function of removing a high band and a low band having a small influence in recognition of the input voice and transmitting the input voice, when the communication quality is deteriorated, the communication quality detection unit 22 may detect the communication quality, on the basis of the removed frequency bands of the addition sound having the predetermined strength in a wide frequency band. The communication quality detection unit 22 outputs information showing the detected communication quality between the transmission terminal 10a and the reception terminal 10b to the transmission unit 16.

The transmission unit 16 receives the information showing the communication quality output from the communication quality detection unit and determines whether the communication quality is less than a reference value. When it is determined that the communication quality is less than the reference value, that is, when the communication quality is deteriorated more than the reference value, the transmission unit 16 can generate a synthesis sound in which the volume level of the addition sound has been changed and transmit a signal of the generated synthesis sound from the transmission terminal 10a to the reception terminal 10b. Specifically, when the communication quality of the transmission terminal 10a and the reception terminal 10b is deteriorated, a synthesis sound may be generated by superimposing an addition sound having a large volume level on the input voice. When it is determined that the communication quality between the transmission terminal 10a and the reception terminal 10b is less than the reference value, the transmission unit 16 may generate a synthesis sound in which a tone of the addition sound has been changed.

The transmission unit 16 transmits the synthesis signal generated as described above to the reception terminal 10b and stores the synthesis signal transmitted to the reception terminal 10b in the storage unit 18. The storage unit 18 is a functional element that stores the synthesis signal transmitted to the reception terminal by the transmission unit 16. The storage unit 18 may associate information identifying the transmission terminal of the transmission destination and a transmission start time with the synthesis signal and store an association result.

The reception unit 20 is a functional element that receives the synthesis signal transmitted from the transmission terminal 10a. If the reception unit 20 receives the synthesis signal from the transmission terminal 10a, the reception unit 20 acquires the synthesis sound from the synthesis signal an outputs the synthesis sound to the voice output unit 23. The voice output unit 23 is a functional element that outputs the synthesis sound. The voice output unit 23 is a speaker, for example, and outputs the synthesis sound obtained by superimposing the addition sound on the input voice to the user of the reception terminal 10b.

Figure 3:
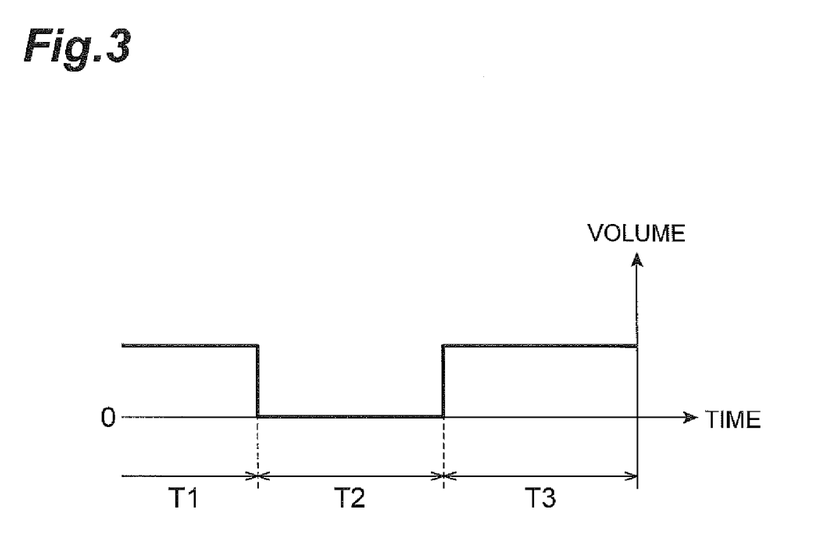
FIG. 3 is a diagram illustrating an example of a temporal change of an addition sound output from a reception terminal.

FIG. 3 illustrates an example of a temporal change of the addition sound output from the voice output unit 23 of the reception terminal 10b to the user of the reception terminal 10b. In FIG. 3, a horizontal axis shows a time and a vertical axis shows a volume level of the addition sound. In this example, the addition sound is a sound having a constant volume temporally. As illustrated in FIG. 3, in this example, the addition sound having the constant volume is output to the user of the reception terminal 10b in time zones T1 and T3. Meanwhile, the addition sound becomes silence in a time zone T2 between the time zones T1 and T3. The user of the reception terminal 10b receives the synthesis sound including the addition sound illustrated in FIG. 3, so that the user can recognize that the voice signal becomes defective in the time zone T2 and the input voice is interrupted.

Figure 4:
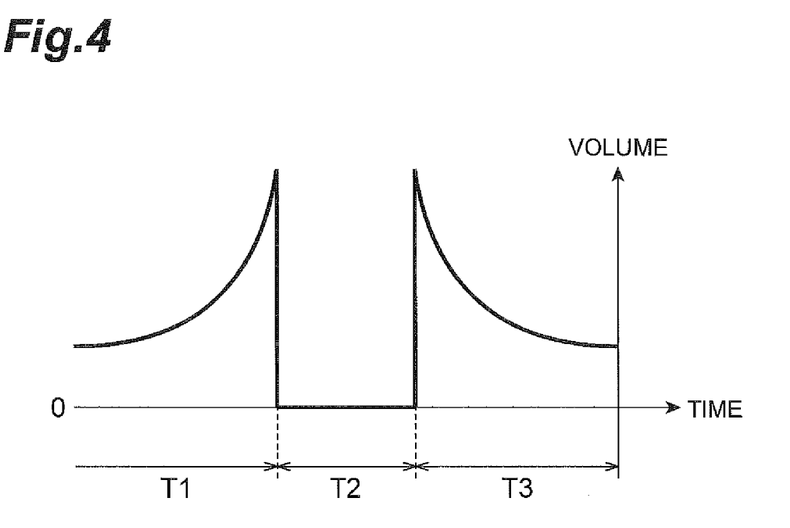
FIG. 4 is a diagram illustrating another example of the temporal change of the addition sound output from the reception terminal.

In addition, FIG. 4 illustrates another example of the temporal change of the addition sound output from the voice output unit 23 of the reception terminal 10b to the user of the reception terminal 10b. In FIG. 4, a horizontal axis shows a time and a vertical axis shows a volume level of the addition sound. As the communication quality is gradually deteriorated in the time zone T1, the volume level of the addition sound illustrated in FIG. 4 gradually increases and as the communication quality is gradually improved in the time zone T3, the volume level of the addition sound gradually decreases. As illustrated in FIG. 4, in this example, the addition sound of which the volume level changes temporally in the time zones T1 and T3 is output to the user of the reception terminal 10b. Meanwhile, the addition sound becomes silence, in the time zone T2 between the time zones T1 and T3. The user of the reception terminal 10b receives the synthesis sound including the addition sound illustrated in FIG. 4, so that the user can recognize that the voice signal becomes defective in the time zone T2 and the input voice is interrupted.

In addition, the user of the reception terminal 10b receives the addition sound of which the volume level gradually increases in the time zone T1, so that the user can recognize that the communication quality is deteriorated in the time zone T1 and the input voice may be interrupted. In addition, the user of the reception terminal 10b receives the addition sound of which the volume level gradually decreases in the time zone T3, so that the user can recognize that the communication quality is improved in the time zone T3.

The audio communication system 1 will be described with reference to FIG. 1 again. In the embodiment, the terminal 10 can further include a defect detection unit 24, a retransmission request unit (retransmission request acquisition unit) 26, a retransmission unit 28, and a control unit 30.

The defect detection unit 24 is a functional element that detects a defective portion of the input voice in the synthesis sound transmitted from the transmission terminal 10a to the reception terminal 10b. The defect detection unit 24 acquires the synthesis signal transmitted from the transmission terminal 10a via the reception unit 20. In addition, the addition sound is extracted from the synthesis sound of the synthesis signal and the defective portion of the input voice is detected on the basis of the addition sound. Specifically, an input voice corresponding to a time zone in which the addition sound is equal to or smaller than the reference value, for example, the addition sound becomes silence is detected as the defective portion of the input voice. The defect detection unit 24 outputs information showing a start time and an end time of the defective portion as information showing the defective portion of the input voice to the retransmission request unit 26.

The retransmission request unit 26 is a functional element that transmits a retransmission request of the defective portion of the input voice from the reception terminal 10b to the transmission terminal 10a. The retransmission request unit 26 transmits a retransmission request including the information showing the defective portion of the input voice to the transmission terminal 10a.

The retransmission unit 28 is a functional element that retransmits the defective portion of the input voice as a retransmission signal from the transmission terminal 10a to the reception terminal 10b, according to the retransmission request transmitted from the retransmission request unit 26. If the retransmission unit 28 receives the retransmission request from the retransmission request unit 26 of the reception terminal 10b via the reception unit 20, the retransmission unit 28 extracts the input voice corresponding to the defective portion from the storage unit 18, on the basis of the information showing the defective portion of the input voice included in the retransmission request. For example, the retransmission unit 28 extracts the input voice corresponding to the defective portion from the storage unit 18, using a start time and an end time of the defective portion and information identifying a reception terminal of a retransmission request source. In addition, the retransmission unit 28 transmits the extracted input voice as a retransmission signal from the transmission terminal 10a to the reception terminal 10b. In addition, the retransmission unit 28 may transmit the retransmission signal in which the addition sound has been superimposed on the input voice corresponding to the defective portion, from the transmission terminal 10a to the reception terminal 10b. In addition, the retransmission unit 28 may provide information showing that the retransmission signal is being transmitted to the reception terminal 10b to the user of the transmission terminal 10a, to restrict utterance from the user of the transmission terminal 10a.

The reception unit 20 receives the retransmission signal from the retransmission unit 28 of the transmission terminal 10a, acquires the input voice corresponding to the defective portion from the retransmission signal, and outputs the input voice from the voice output unit 23. As such, the defective portion of the input voice is retransmitted from the transmission terminal 10a to the reception terminal 10b, so that work for causing the user of the transmission terminal 10a to utter (input) a part of the interrupted input voice again can be omitted. Therefore, a complication of the user of the transmission terminal 10a can be resolved and audio communication between the user of the transmission terminal 10a and the user of the reception terminal 10b can be executed smoothly.

In addition, the retransmission request unit 26 may transmit a retransmission request to the transmission terminal 10a, according to a request of the user of the reception terminal 10b. For example, when the defective portion of the input voice is detected in the defect detection unit 24 of the reception terminal 10b, the defect detection unit 24 displays a retransmission button on the display unit 32 of the reception terminal 10b. In addition, when the retransmission button of the display unit 32 is pressed by an operation of the user of the reception terminal 10b, the retransmission request unit 26 of the reception terminal 10b may transmit a retransmission request of the defective portion of the input voice to the transmission terminal 10a. In addition, when the retransmission button is not displayed and the user of the reception terminal 10b utters a voice called "retransmission", the retransmission request unit 26 may transmit the retransmission request of the defective portion of the input voice to the transmission terminal 10a.

In addition, the control unit 30 is a functional element that controls transmission timing of the synthesis signal transmitted from the transmission unit 16 of the transmission terminal 10a. The control unit 30 controls the transmission unit 16 of the transmission terminal 10a, such that the synthesis signal is not transmitted from the transmission unit 16 to the reception terminal 10b, in a retransmission time zone to be a time zone in which the retransmission signal is transmitted from the retransmission unit 28 of the transmission terminal 10a. For example, when it is detected that the input voice has been input from the user of the transmission terminal 10a to the voice input unit 12 in the retransmission time zone, the control unit 30 may control the transmission unit 16 to transmit the synthesis signal including the detected input signal from the transmission unit 16, after transmission of the retransmission signal from the retransmission unit 28 of the transmission terminal 10a is completed. That is, the control unit 30 can set transmission timing of the synthesis signal including the input signal input in the retransmission time zone to timing after the retransmission time zone, for example, timing when the retransmission time zone ends.

As such, the synthesis signal including the input signal input in the retransmission time zone is transmitted to the reception terminal 10b when the retransmission time zone ends, so that mixed input voices of the input voice included in the synthesis signal and the input voice included in the retransmission signal can be prevented from being output from the voice output unit 23 of the reception terminal 10b.

In the embodiment, an aspect of retransmission by the retransmission unit 28 can be changed as follows.

For example, the retransmission unit 28 may set a predetermined section including the defective portion in the input voice, on the basis of the information showing the defective portion of the input voice transmitted from the reception terminal 10b, and retransmit the input voice in the predetermined section from the transmission terminal 10a to the reception terminal 10b. For example, the retransmission unit 28 extracts the input voice including the defective portion from the storage unit 18, converts the extracted input voice into a string by a voice recognition process, and divides the string in a clause or sentence unit by a parsing process. In addition, the clause or the sentence including the defective portion may be set as the predetermined section and the input voice included in the predetermined section may be transmitted as the retransmission signal from the transmission terminal 10a to the reception terminal 10b.

As a specific example, when an input voice transmitted from the transmission terminal 10a is "A next meeting is March 8. A place is an A meeting room" and a retransmission request for portions "8" and "A place is an A" as the defective portions is transmitted from the reception terminal 10b to the transmission terminal 10a, the retransmission unit 28 sets the entire sentence "A next meeting is March 8. A place is an A meeting room" as the predetermined section and can retransmit the input voice of the section. As in this example, the retransmission unit 28 retransmits the input voice in the clause or sentence unit, so that content of the voice of the defective portions can be retransmitted to facilitate understanding of the user of the reception terminal 10b, as compared with the case in which only the defective portions are retransmitted.

As another aspect, the retransmission unit 28 may set the predetermined section including the defective portion in the input voice, on the basis of the volume or the tone of the input voice corresponding to the defective portion, and transmit the input voice included in the predetermined section as the retransmission signal from the transmission terminal 10a to the reception terminal 10b. For example, the retransmission unit 28 may set a region where the volume or the tone of the input voice corresponding to the defective portion is larger than the reference value as a section to retransmit the input voice. This is because the possibility of content having high importance being included in a portion having a high volume or tone in the input voice.

In addition, the retransmission unit 28 may determine the retransmission according to the reception terminal of the retransmission destination. For example, the retransmission unit 28 may store a list of terminals having high importance in a predetermined storage unit, may transmit the defective portion of the input voice to the reception terminal 10b, when the reception terminal 10b to be the terminal of the retransmission destination is included in the list of the predetermined storage unit, and may not transmit the defective portion of the input voice to the reception terminal 10b, when the reception terminal 10b to be the terminal of the retransmission destination is not included in the list of the predetermined storage unit.

In addition, the retransmission unit 28 may convert the input voice corresponding to the defective portion into a fast-forwarded voice and retransmit a signal of the fast-forwarded voice from the transmission terminal 10a to the reception terminal. As such, the retransmission unit 28 transmits the signal of the fast-forwarded voice, so that a time for which the synthesis signal cannot be transmitted from the transmission unit 16 can be shortened. In addition, the retransmission unit 28 may detect and remove a silence portion of the signal of the fast-forwarded voice, and process the voice in which a sound portion after the silence portion is temporally shifted ahead in a time zone where the silence portion exists. The retransmission unit 28 may also retransmit the processed voice. As a result, the time for which the synthesis signal cannot be transmitted from the transmission unit 16 can be further shortened.

Figure 5:
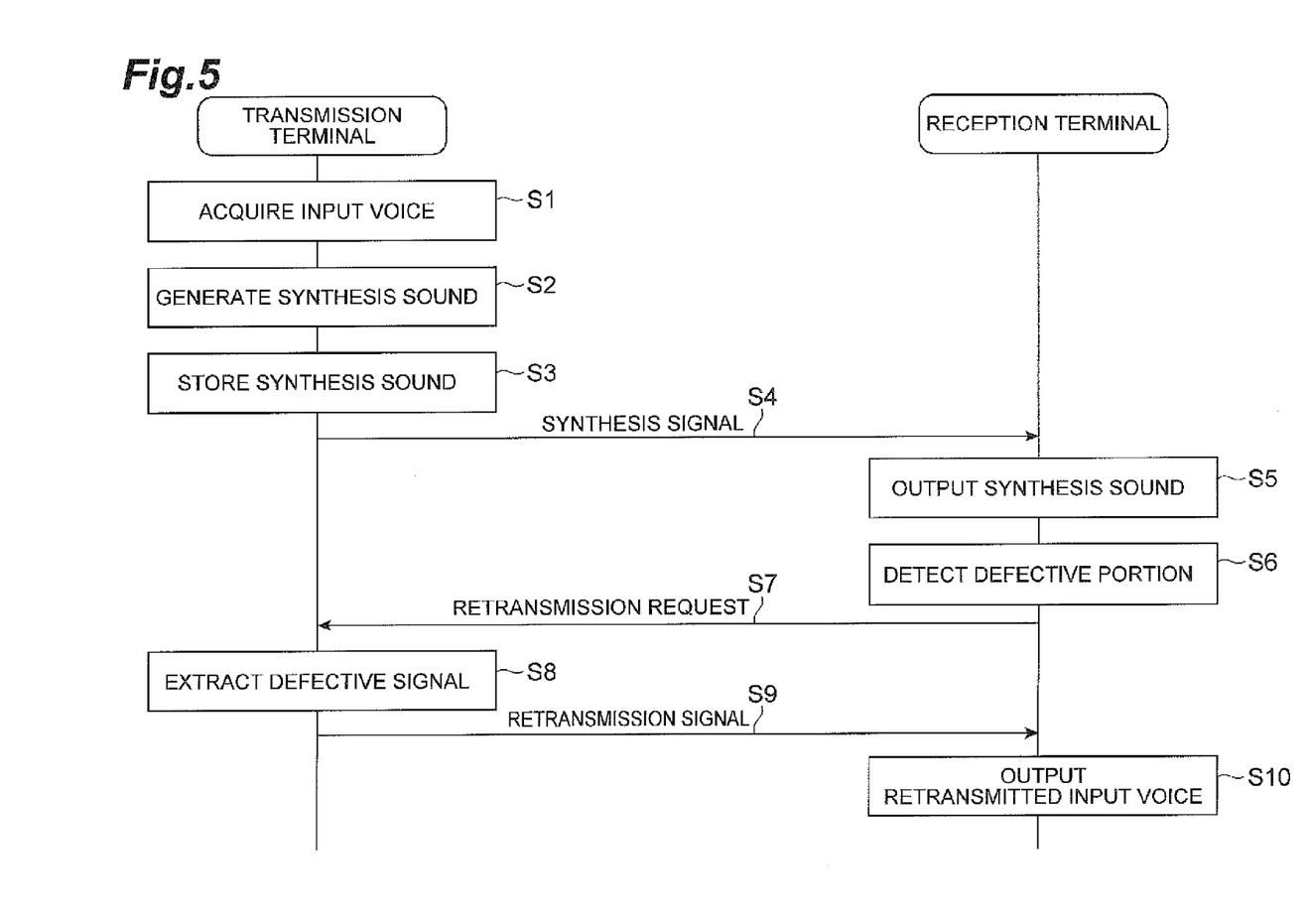
FIG. 5 is a sequence diagram illustrating an operation of the audio communication system according to the embodiment.

Next, an operation of the audio communication system 1 illustrated in FIG. 1 and an audio communication method according to an embodiment will be described using FIG. 5. FIG. 5 is a sequence diagram illustrating the operation of the audio communication system 1.

First, the voice input unit 12 of the transmission terminal 10*a* acquires the input voice of the user of the transmission terminal 10*a* (step S1). In addition, the transmission unit 16 of the transmission terminal 10*a* generates a synthesis sound by superimposing the addition sound generated by the addition sound generation unit 14 on the input voice (step S2, generation step). Then, the transmission unit 16 of the transmission terminal 10*a* stores the synthesis sound generated in step S2 in the storage unit 18 (step S3) and transmits the synthesis signal to the reception terminal 10*b* (step S4, transmission step). At this time, when the communication quality between the transmission terminal 10*a* and the reception terminal 10*b* is less than the reference value, the transmission unit 16 of the transmission terminal 10*a* may transmit a signal of the synthesis sound in which a volume level of the addition sound has been changed, to the reception terminal 10*b*.

The reception unit 20 of the reception terminal 10*b* receives the synthesis signal from the transmission terminal 10*a* and outputs the synthesis sound of the synthesis signal from the voice output unit 23 to the user of the reception terminal 10*b* (step S5, voice output step). In this way, the synthesis sound obtained by superimposing the addition sound on the input voice is output to the user of the reception terminal 10*b*.

In the audio communication method according to the embodiment, the defect detection unit 24 of the reception terminal 10*b* can detect the defective portion of the input voice (step S6). In addition, when the defective portion of the input voice is detected in the defect detection unit 24, the retransmission request unit 26 of the reception terminal 10*b* transmits a retransmission request of the defective portion to the transmission terminal 10*a*, according to a request of the user of the reception terminal 10*b* (step S7).

Next, the retransmission unit 28 of the transmission terminal 10*a* extracts the input voice corresponding to the defective portion from the storage unit 18, according to the retransmission request from the transmission terminal 10*a* (step S8), and retransmits the input voice corresponding to the defective portion as a retransmission signal to the reception terminal 10*b* (step S9). In addition, the reception unit 20 of the reception terminal 10*b* outputs the retransmitted input voice from the voice output unit 23 of the reception terminal 10*b* (step S10). In this way, a series of processes in the audio communication method according to the embodiment ends.

Figure 6:
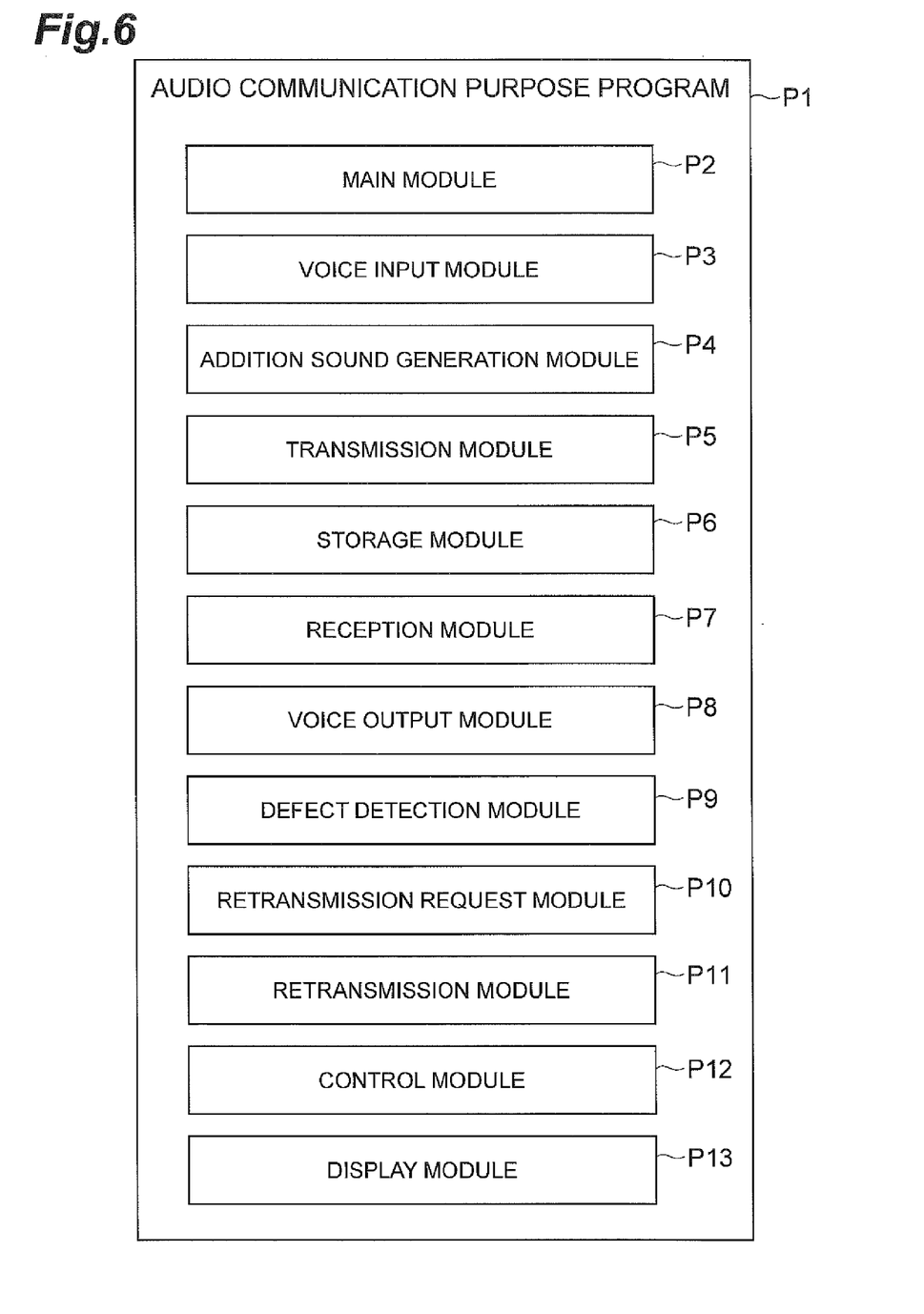
FIG. 6 is a diagram illustrating a configuration of an audio communication purpose program according to an embodiment.

Next, an audio communication purpose program for causing a computer (for example, a terminal) to execute the series of processes will be described using FIG. 6. FIG. 6 is a diagram illustrating a configuration of the audio communication purpose program according to the embodiment. The program is applied to the terminal, so that an audio transmission terminal purpose program for causing the terminal to function as the transmission terminal 10*a* and the reception terminal 10*b* having the above functions can be realized.

An audio communication purpose program P1 includes a main module P2, a voice input module P3, an addition sound generation module P4, a transmission module P5, a storage module P6, a reception module P7, a voice output module P8, a defect detection module P9, a retransmission request module P10, a retransmission module P11, a control module P12, and a display module P13.

The main module P2 is a portion that wholly controls communication. Respective functions realized by executing the voice input module P3, the addition sound generation module P4, the transmission module P5, the storage module P6, the reception module P7, the voice output module P8, the defect detection module P9, the retransmission request module P10, the retransmission module P11, the control module P12, and the display module P13 are the same as the respective functions of the voice input unit 12, the addition sound generation unit 14, the transmission unit 16, the storage unit 18, the reception unit 20, the voice output unit 23, the defect detection unit 24, the retransmission request unit 26, the retransmission unit 28, the control unit 30, and the display unit 32.

The audio communication purpose program P1 is recorded on a tangible recording medium such as a CD-ROM, a DVD-ROM, and a semiconductor memory and is provided. In addition, the audio communication purpose program P1 may be provided as a data signal superimposed on a carrier via the network N.

As described above, in the audio communication system 1, the synthesis signal of the synthesis sound obtained by superimposing the addition sound on the input voice is transmitted from the transmission terminal 10*a* to the reception terminal 10*b*. In addition, the synthesis sound is output from the reception terminal 10*b*. As a result, the user of the reception terminal 10*b* can determine that a defect has occurred in the voice signal, when the addition sound of the synthesis sound is interrupted. Because the addition sound is superimposed on the input voice and is transmitted to the reception terminal 10*b*, a new function is not necessary in the reception terminal 10*b* for voice reception. Therefore, according to the audio communication system 1, the defect of the voice signal can be detected in the reception terminal 10*b* without modifying the reception terminal 10*b*.

The present invention has been described in detail on the basis of the embodiment thereof. However, the present invention is not limited to the embodiment. In the present invention, various modifications can be made without departing from the scope thereof.

For example, as described above, the terminal 10 includes the voice input unit 12, the addition sound generation unit 14, the transmission unit 16, the storage unit 18, the reception unit 20, the voice output unit 23, the defect detection unit 24, the retransmission request unit 26, the retransmission unit 28, and the control unit 30. However, a part of the individual functional elements may be included in a server provided to be separated from the terminal 10.

In the embodiment, the audio communication system 1 performs the audio communication between the two terminals 10. However, the audio communication may be performed between three or more terminals. In addition, the transmission terminal 10*a* may transmit the synthesis signal and a video signal to the reception terminal 10*b*.

In addition, when the retransmission signal is transmitted from the transmission terminal 10*a* to the reception terminal 10*b*, information showing that transmission of the input voice is stopped temporarily may be displayed on the display unit 32 and transmission of the voice input voice may be resumed after the retransmission of the retransmission signal ends. In the embodiment, one-way communication in which the input voice is transmitted from the transmission terminal 10*a* to the reception terminal 10*b* has been mainly described. However, the present invention can be applied to two-way communication in which the input voice is transmitted and received between the transmission terminal 10*a* and the reception terminal 10*b*.

In addition, the retransmission request unit 26 may transmit the retransmission request from the reception terminal 10*b* to the transmission terminal 10*a*, after a call between the plurality of terminals 10 ends. In this case, the user of the reception terminal 10*b* can hear the input voice of the defective portion after a voice call ends. When the input voice corresponding to the time zone corresponding to the retransmission request does not exist (for example, when the user of the transmission terminal 10a does not input the voice in the time zone corresponding to the retransmission request), the retransmission unit 28 may transmit information showing that the input voice corresponding to the retransmission request does not exist to the reception terminal 10b.

In addition, the retransmission unit 28 of the transmission terminal 10a may transmit the input voice from a time that is a predetermined time (for example, three seconds) earlier than a reception time of the retransmission request from the retransmission request unit 28 of the reception terminal 10b, to the reception terminal 10b.

In addition, in the embodiment, the synthesis signal is not transmitted from the transmission terminal 10a to the reception terminal 10b, in the retransmission time zone. However, the synthesis signal may be transmitted in the retransmission time zone. Even in this case, a situation where the input voice is not received in the reception terminal 10b can be prevented from occurring and a situation where the user of the reception terminal 10b fails to hear the input voice can be prevented from occurring.

REFERENCE SIGNS LIST 1 audio communication system
10a transmission terminal
10b reception terminal
12 voice input unit
14 addition sound generation unit
16 transmission unit
18 storage unit
20 reception unit
22 communication quality detection unit
23 voice output unit
24 defect detection unit
26 retransmission request unit
28 retransmission unit
30 control unit
32 display unit
N network
T1, T2, T3 time zone

The invention claimed is:
1. An audio transmission terminal comprising:
a generation unit that superimposes an addition sound having a constant volume level on an input voice sequentially acquired by a voice acquisition unit, and generates a synthesis sound;
a transmission unit that sequentially transmits a signal of the synthesis sound generated by the generation unit to an audio reception terminal;
a retransmission request acquisition unit that acquires a retransmission request of a defective portion of the input voice detected on the basis of the addition sound from the audio reception terminal;
a retransmission unit that retransmits a signal of the input voice corresponding to the defective portion to the audio reception terminal according to the retransmission request; and
a control unit that controls the transmission unit, such that the signal of the synthesis sound is not transmitted from the transmission unit, in a retransmission time zone to be a time zone in which the signal of the input voice corresponding to the defective portion is transmitted from the retransmission unit.

2. The audio transmission terminal according to claim 1, wherein the control unit detects an input voice acquired by the voice acquisition unit in the retransmission time zone, and sets transmission timing of a signal of a synthesis sound including the detected input voice to a timing when the retransmission time zone ends.

3. The audio transmission terminal according to claim 1, wherein the retransmission unit sets a predetermined section including the defective portion in the input voice on the basis of the defective portion, and retransmits the input voice in the predetermined section to the audio reception terminal.

4. The audio transmission terminal according to claim 3, wherein the retransmission unit sets the predetermined section on the basis of a volume or a tone of the input voice.

5. The audio transmission terminal according to claim 1, wherein the retransmission unit determines whether the signal of the input voice corresponding to the defective portion is retransmitted to the audio reception terminal according to the audio reception terminal.

6. The audio transmission terminal according to claim 1, wherein the retransmission unit retransmits a signal of a voice in which the input voice corresponding to the defective portion is fast-forwarded to the audio reception terminal.

7. The audio transmission terminal according to claim 1, wherein the retransmission unit retransmits a signal of a voice from which a silence portion of the defective portion is removed to the audio reception terminal.

8. An audio transmission terminal comprising:
a generation unit that superimposes an addition sound having a constant volume level to detect a defective portion of an input voice sequentially acquired by a voice acquisition unit on the input voice, and generates a synthesis sound;
a transmission unit that sequentially transmits a signal of the synthesis sound generated by the generation unit to an audio reception terminal; and
a communication quality detection unit that detects a communication quality between the audio transmission terminal and the audio reception terminal,
wherein the generation unit changes the volume level of the addition sound on the basis of the detected communication quality, instead of setting the volume level of the addition sound to be constant, when the communication quality detected by the communication quality detection unit is less than a reference value.

* * * * *